Aug. 18, 1959     T. R. SMITH ET AL     2,899,818
VARIABLE LIQUID LEVEL CONTROL
Filed Aug. 13, 1953     4 Sheets-Sheet 2
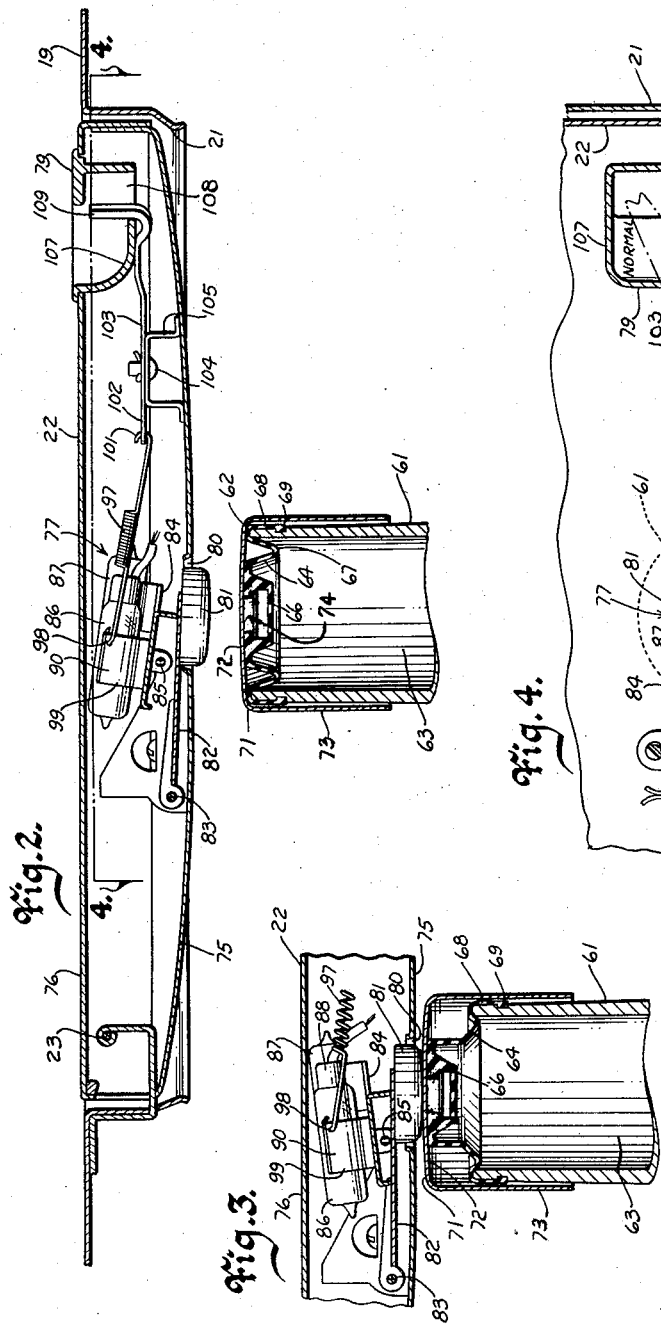
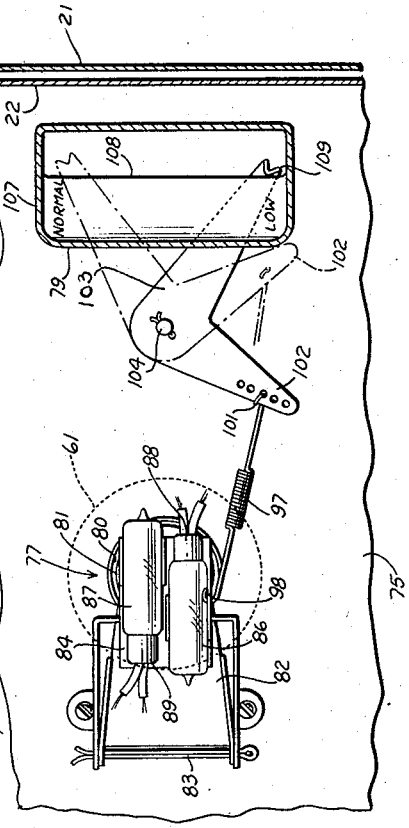
Inventors
Thomas R. Smith
& William F. Scott
by J. K. Mosser
Agent

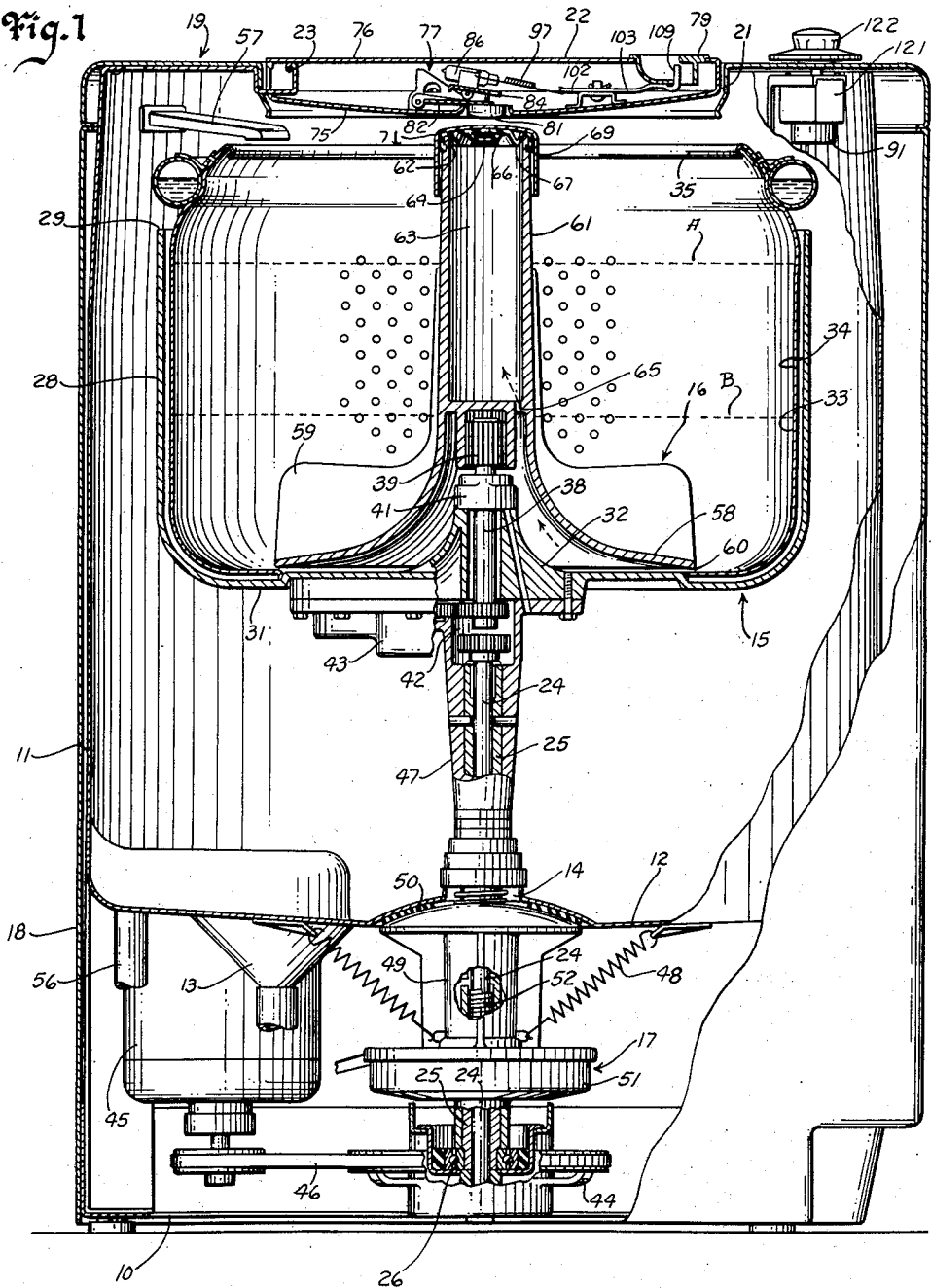

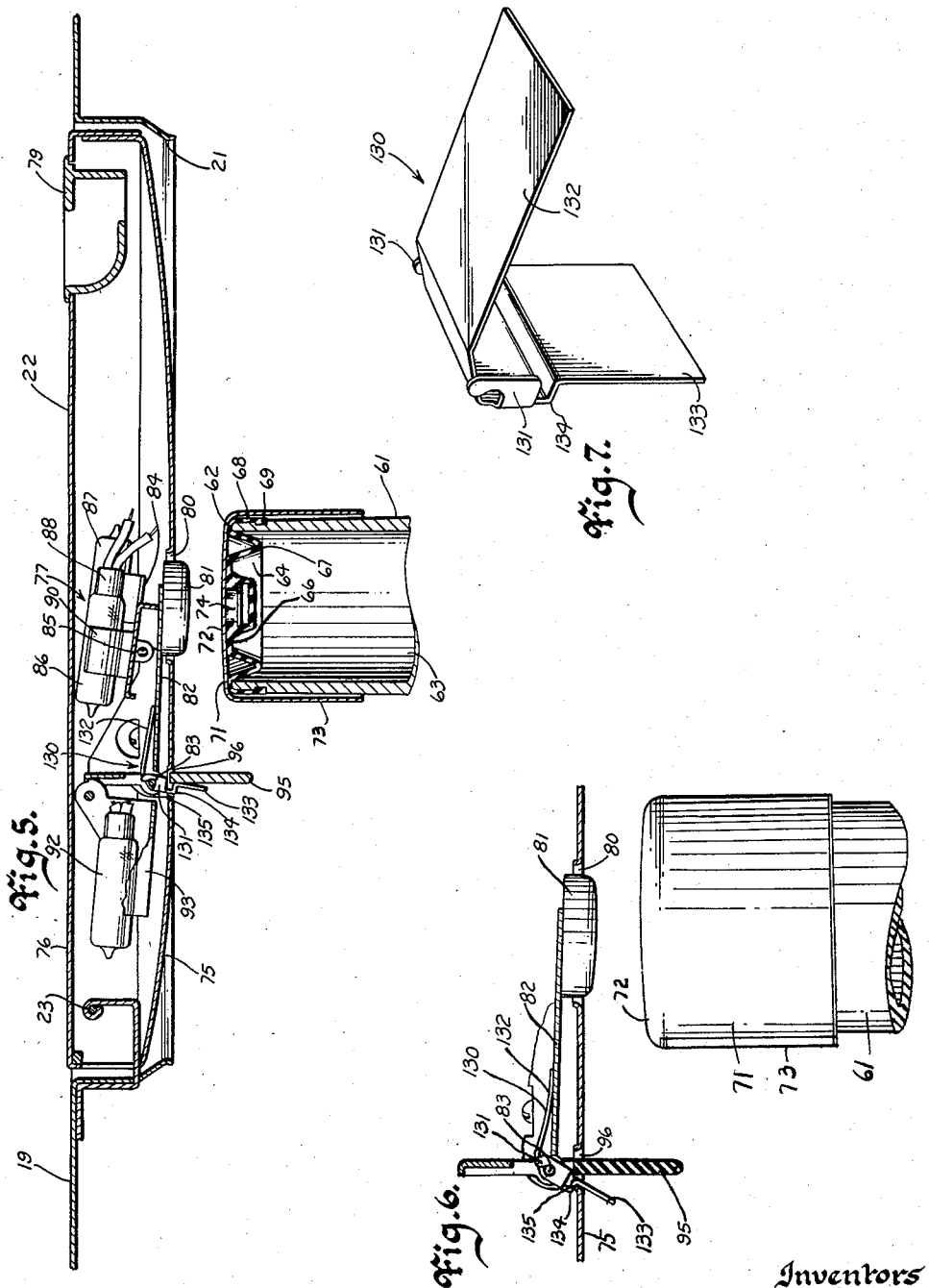

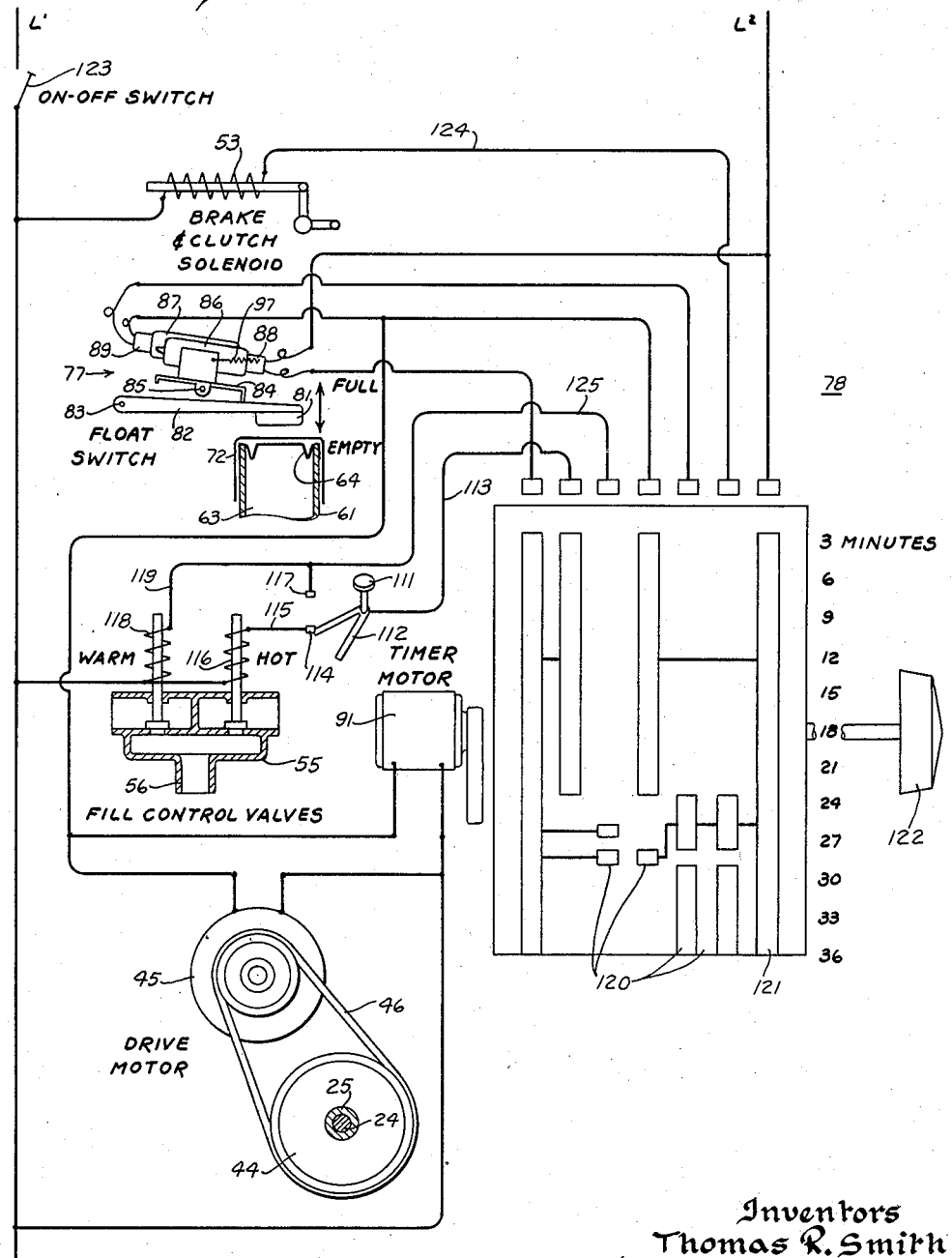

United States Patent Office 2,899,818
Patented Aug. 18, 1959

2,899,818

VARIABLE LIQUID LEVEL CONTROL

Thomas R. Smith and William F. Scott, Newton, Iowa, assignors to The Maytag Company, Newton, Iowa, a corporation of Delaware Application August 13, 1953, Serial No. 374,024

6 Claims. (Cl. 68—207)

The invention relates to control apparatus and more particularly to control apparatus for a washing machine for initiating a washing operation at different liquid levels.

It is one of the objects of the invention to provide a simplified control arrangement for a washing machine whereby the operator may readily manipulate mechanism which modifies the sensitivity of the control so that it responds to automatically initiate the washing operation at selected liquid levels.

Heretofore in automatically operated washing machines having a tub rotatable about its vertical axis, it has been difficult to provide an effective automatic control means which may be readily adjusted to respond at varying liquid levels within the tub for washing correspondingly varying quantities of clothing or fabrics for both the washing and rinsing operations. While variable liquid level control means have been previously suggested in the form of manually operable switches and the like, most of these suggestions require the operator to remain at the machine and personally observe and estimate the desired liquid level. At times this is inconvenient and there is always the likelihood the operator's estimate of the proper quantity of liquid will be erroneous, with the result either too much or too little liquid may be supplied for proper washing. In addition, the operator must either observe the proper liquid level for the rinsing operation or the rinsing operation is carried out with the normal full load quantity of water. In still other arrangements, additional switches and floats are required which, of course, add to the complication and cost of the apparatus.

In accordance with the invention a washing machine having a tub rotatable about its vertical axis is provided with an oscillatable agitator therein which has an upwardly extending hollow center post, and a cover or lid is mounted above the tub to cover the same. Carried at the upper portion of the hollow center post is liquid level sensitive mechanism capable of transmitting a force corresponding to the level of liquid within the tub to control or switch mechanism mounted in the lid. This switch mechanism, when actuated, causes the washing machine to operate in a predetermined sequence to wash and rinse the clothing to be treated.

Means in the form of a spring or the like likewise carried by the lid is readily adjusted by suitable mechanism to vary the loading on the switch mechanism so that it will require different forces transmitted by the liquid level sensitive mechanism corresponding to different liquid levels in the tub to initiate the automatic washing operation for treating variable quantities of clothing.

It is, therefore, another object of the invention to provide a washing machine having a tub rotatable about its vertical axis with a control means which may be selectively adjusted in accordance with varying amounts of clothing to be treated and which responds when the selected liquid level is reached within the tub to initiate the automatic operation of the washing machine.

It is yet another object of the invention to provide a washing machine having a tub rotatable about its vertical axis and carrying liquid level responsive mechanism therein for actuating control mechanism provided with variable loading means which requires different levels of liquid in the tub to actuate the control to initiate the washing operation.

It is still another object of the invention to provide a washing machine including a tub rotatable about its vertical axis and having a detachable oscillatable agitator with a hollow center post mounted therein which has a diaphragm carried by the center post that is not only responsive to the level of liquid within the tub to operate control mechanism to initiate the washing operation but is also effective to trap a column of air within the center post to prevent liquid contact with mechanism disposed within the confines of the agitator.

Other objects, features, capabilities and advantages are comprehended by the invention as will later appear and as are inherently possessed thereby.

Referring to the drawings:

Figure 1 is a vertical longitudinal partial sectional view of a washing machine of the vertical axis type having the improved variable liquid level control mechanism applied thereto;

Figure 2 is an enlarged detail sectional view of the improved control apparatus shown in Figure 1 showing the position of the control with no or a low liquid level in the tub;

Figure 3 is a view similar to Figure 2 showing the position of the control when actuated in response to the level of the liquid in the tub;

Figure 4 is a horizontal sectional view of the control apparatus taken generally along the line 4—4 of Figure 2;

Figure 5 is a view similar to Figure 2 showing a modified construction of an adjustable control means for the control apparatus in its low level position;

Figure 6 is an enlarged detail sectional view of the construction as shown in Figure 5 in its normal level position;

Figure 7 is a perspective view of the loading means shown in Figures 5 and 6; and Figure 8 is a schematic wiring diagram of a control arrangement to which the improved apparatus is applicable.

Referring now in more detail to the drawings for one form of an automatically operated combined washing and drying machine of the vertical axis type, embodying a control mechanism including adjustable liquid level responsive means made in accordance with the present invention, there is shown a base structure 10 which provides a support for an outer stationary container or tub 11, having a bottom wall 12 with a drain opening 13 and a central crowned opening 14 therein, a support for a rotatable inner receptable or tub 15, mounted for rotation about a vertical axis and having an oscillatable agitator or washing device 16 disposed therein, as well as support for mechanism generally referred to as 17, for operating the agitator for the washing operation and for rotating the tub in a washing cycle as will be hereinafter more fully described.

Enclosing the above mechanism and secured to the base 10 is a cabinet 18 which includes a top or cover panel 19 formed with an opening 21 to permit access to the inner rotatable tub 15 and it is normally closed by a two-piece hollow lid or closure 22 having one side hinged at 23 to the top panel to pivot about a horizontal axis.

Extending through the crowned opening 14 are vertical co-axial shaft means in the form of a rotatable inner shaft 24 and a rotatable outer tubular shaft 25 whose lower end is mounted in a combined radial and thrust bearing 26 carried by the base 10 and whose upper end supports the rotatable tub 15 within and at the upper portion of the outer tub 11 for lateral movement. The inner rotatable tub 15 includes an outer substantially imperforate cup-shaped portion having a substantially vertical sidewall 28 terminating in the top edge 29 disposed above the normal liquid level A desired for washing and a generally horizontal bottom wall 31 formed with a centrally disposed upwardly extending hub 32, and an open ended cylindrical basket 33 having a lower perforate portion 34 disposed in substantially parallel relation to the imperforate portion to provide a space therebetween for free flow of the washing liquid out of the receptacle and over the top edge 29 when it is rotated. The basket is secured to the imperforate portion in any suitable manner and its upper portion is imperforate and extends upwardly and inwardly above the top edge 29 terminating to define an opening 35 disposed in alignment with the opening in the cover 19.

Projecting upwardly from the hub 32 is a vertically disposed oscillatable shaft 38 splined to a mating hub 39 formed within the agitator 16 for actuating or oscillating the same about a vertical axis to agitate the material and water therein. Any suitable sealing means 41 may be utilized between the hub 32 and shaft 38 to provide a fluid tight joint.

Means for oscillating the agitator 16 is provided by suitable mechanism generally indicated at 42, which in this construction, is carried in a gear housing 43 secured to the bottom of the rotatable tub 15 to increase the mass thereof. This oscillating mechanism is preferably directly operated by the inner rotatable shaft 24 which has a driven pulley 44 secured thereto at its lower end, the same being continuously rotated in one direction by a motor 45 by means of a belt 46. The gear housing 43 is further provided with a downwardly projecting hub portion 47 concentric with the shaft means and is rigidly secured to the upper end of the outer tubular shaft 25.

Since the combined radial and thrust bearing 26 provides the sole support for the rotatable tub 15 which is free to tilt thereabout, centering means in the form of a plurality of oppositely disposed springs 48 are provided to maintain the tub in a substantially vertical position. These centering springs are disposed at an angle to provide a component of force axially of the shaft means in addition to the centering action, and each has one of their ends connected to the bottom 12 of the stationary tub 11 and the opposite ends are connected to a damper housing 49 journalled on and concentric to the outer shaft 25 and disposed adjacent to and beneath the bottom of the stationary tub. The damper housing includes friction material 50 adapted to engage the crowned portion of the stationary tub to reduce the amplitude of movement of the rotary tub during the extraction operation.

A brake mechanism 51 also carried by the damper housing 49 is secured in part to the stationary tub 11 and the outer shaft 25 and holds the receptacle 15 stationary during the washing operation and permits its rotation by the shaft means during the spinning operation. The operation of both the brake and a clutch 52 for the shaft means is under control of a solenoid 53 (Figure 8) which when deenergized applies the brake and renders the clutch inactive and when energized releases the brake and engages the clutch to connect the inner and outer shafts 24 and 25, respectively, together to drive the same in unison.

A clutch, centering means, mrake and damper mechanisms suitable for effecting the above operation are described in the Smith co-ponding application, Serial No. 66,230, filed December 20, 1948, now Patent No. 2,645,108, issued July 14, 1953, and assigned to the assignee of the present invention. It is to be understood, however, that said application discloses but one form of such mechanisms suitable for operating the washing machine as herein disclosed and that other suitable types may be utilized.

Hot and cold washing liquid or water is supplied from suitable conduits to a thermostatically controlled mixing valve 55 (Figure 8) which delivers the water at the proper temperature into a conduit 56 connected on an inlet nozzle 57 for discharging the same into the rotatable receptacle through its upper open end 35.

The agitator 16 disposed within the inner tub 15, is formed with an imperforate flaring base or body portion 58 extending downwardly and outwardly over the hub 32 to underlie the clothes, and has one or more blades 59 extending radially upwardly and outwardly from the upper portion of the base adapted to agitate the liquid within the tub upon oscillation of the agitator for effecting the washing operation. The lowermost portion of the base terminates in a peripheral bead disposed closely adjacent the bottom wall 31 of the rotatable tub 15 to define a circumferential opening 60 providing communication between the interior of the agitator and the surrouding tub.

The body portion 58 of the agitator is further provided with an upwardly extending hollow cylindrical center post or pedestal 61 disposed on the vertical axis of the tub which terminates in an upper open end 62 above the normal liquid level therein. The hollow interior of the agitator provides an inner chamber or compartment defining an air chamber 63 with the upper end 62 enclosed by a flexible imperforate member or diaphargm 64. The splined hub portion 39 of the agitator divides the air chamber into upper and lower compartments. The cylindrical upper compartment defined by the center post communicates with the interior of the lower compartment or portion of the agitator through a suitable restricted orifice or opening 65 which extends through the portion to one side and substantially parallel with the splined hub. This orifice is preferably of such dimension as to prevent any rapid or transient pressure fluctuations that may occur at the lower portion of the agitator, due to its oscillation, from being immediately transferred to the upper air chamber. All relatively slow changes in air pressure would not be affected to any great extent. In this design the entire surface of the body portion 58 of the agitator exposed to the liquid is imperforate so that the only way water can enter the interior portion of the agitator is at the circumferential space 60 provided below its lower outermost edge.

The flexible diaphragm 64 at the upper end 62 of the center post 61 is formed from rubber or the like, and comprises a substantially horizontal undercut recessed central portion 66, an intermediate annular corrugated or V-shaped portion 67 to permit flexing and vertical movement of the central portion 66, and an outer annular downwardly directed ring portion 68 adapted to embrace the upper end of the center post. This ring portion terminates in an enlarged bead 69 snugly fitting into an outwardly opening annular recess on the outer surface of the center post adjacent its upper end to provide a fluid tight seal. Covering the flexible diaphragm is an inverted cup-shaped member 71 having an upper generally horizontal flat surface 72 and a cylindrical sidewall 73 which is loosely placed over the top of the center post and is moveable vertically by means of the diaphragm 64 in a manner to be hereinafter described. In order to secure the cap 71 to the diaphragm 64 to insure movement therewith at all times, the cap is provided with an inwardly directed centrally disposed annular clip 74 which closely fits within the recessed portion of the diaphragm.

In the washing machine herein disclosed, the hollow lid 22 in the cabinet 18 includes a base section 75 and a removable cover section 76 secured together to form a unitary structure to provide a chamber or compartment for a plurality of switch assemblies or devices 77 constituting a part of a control mechanism 78 (Figure 8). The cover section 76 is preferably relieved adjacent the front end remote from the hinge 23 to receive a recessed handle or grip device 79 which can be readily grasped by the operator to swing the lid into and out of its closed position. The base or lower wall section 75 is provided with an aperture 80 through which a control button 81 for the switch assembly 77 loosely projects directly above and preferably in alignment with the cap 71 on the top of the center post 61.

This control button is secured adjacent one end of a lever 82 horizontally pivoted at its opposite end to a pin 83 carried by the lower wall section, and a tiltable bracket 84 mounted above the lever 82 on a horizontal pivot 85 provides a pivotal support for a pair of control means or switches 86 and 87 of the mercury type. The bracket 84 is moveable about its pivot 85 by the lever 82 when the same is moved or elevated by the liquid level responsive diaphragm 64.

The mercury switches are preferably mounted so their longitudinal axes are generally in a horizontal plane and have their contacts 88 and 89, respectively, oppositely disposed, as more clearly shown in Figures 4 and 8 of the drawings. As shown in Figures 1 and 2, the button 81 is in its lowest position, indicating that the receptacle is empty or that the liquid is at such a low level as to be ineffective to raise the pressure responsive diaphragm 64. Under such circumstances, the contacts 88 in the switch 86 are bridged by the mercury contained therein, whereas the contacts 89 are not bridged by the mercury in the other switch 87. However, upon the washing liquid reaching a predetermined level in the tub the diaphragm 64 is elevated by the pressure developed by the head of the liquid and the button 81 is engaged by the cap 71 covering the diaphragm and the lever 82 is raised upwardly. This upward movement of the lever causes the bracket 84 to tilt about its pivot 85 to the position shown in Figure 3 whereby the mercury in the first switch is moved to the end opposite the contacts 88 to open the circuit to interrupt the flow of water to the tub and the mercury in the other switch 87 is moved to bridge the contacts 89 therein to energize a timer motor 91 and the main driving motor 45.

In order to control the level of liquid within the tub in accordance with the quantity of fabrics to be washed to provide for more economical use of hot water and detergent, means carried by the lid 22 are provided to act on the switch assembly 77 so that actuation will take place at different liquid levels. As shown, assuming water is being admitted to the tub, as soon as the level of liquid rises above the lower peripheral edge of the agitator all of the air within the interior of the agitator is trapped because the agitator is imperforate and its upper end is sealed by the diaphragm 64. From this point on, any increase in the liquid level within the tub increases the head of liquid with respect to the interior of the agitator which in turn acts to compress the air in the column 62. This increased pressure is applied equally throughout, is transferred through the orifice 65 and acts against the lower side of the diaphragm 64 to move the central portion 66 vertically. As the liquid level continues to increase, the pressure on the diaphragm increases a like amount until it reaches a point where it overcomes the gravitational weight of the cap 71 and the natural resistance of the diaphragm, after which, any increase in liquid level results in a vertical upward movement of the cap and diaphragm. Toward the upper limit of the diaphragm travel the cap engages the downwardly directed button 81 on the bracket 82 and elevates the same to actuate the switch assembly 77 as previously described and shown in Figure 3. Since the force required to move the switches is not great and the pressures developed in the air column is in direct proportion to the level of the liquid within the tub, it can be seen that by properly proportioning the area of the diaphragm it can be made to respond at a relatively low level of liquid to actuate the switches.

While with an arrangement of this type the diaphragm responds to a low minimum level (e.g. line B, Figure 1) corresponding to the low or small fabric loads, means are provided to proportionately counteract the force applied to the diaphragm to delay operation of the switch mechanism until higher liquid levels are reached in the tub corresponding to use for larger quantities of fabrics, to be washed.

In the preferred form, this is accomplished by loading or biasing the tiltable switch bracket 84 in a downward direction to oppose the upward movement of the diaphragm 64. As shown, a spring member 97 has one end 98 secured to the bracket at the switch clip 99 and its other end 101 is secured in one of a plurality of adjustment openings adjacent the end of a crank arm 102 formed as part of a manually operated lever 103. This lever is pivoted for horizontal arcuate movement about a pin 104 secured to a bracket 105 extending upwardly from the bottom wall 75 in the lid. The crank arm 102 extends in the general direction of the switch assembly while the lever extends in the opposite direction and underlies the lower side of the recessed handle 79. A portion of the bottom wall 107 of the handle has a rectangular opening 108 under the grip portion through which the vertical upturned end 109 of the lever projects. In this manner the upwardly projecting end of the lever within the recessed handle is adapted to be manually moved by the operator to move the same and its crank arm to a number of selected positions within the limits defined by the rectangular opening 108 to vary the loading on the switch and to indicate the selected liquid level. A portion of the upper surface of the horizontal lever 103 is adapted to frictionally engage the lower surface of the bottom wall 107 to hold the lever in the selected position.

As viewed in Figure 4, it can be seen that when the lever 103 is moved toward the bottom of the sheet, the crank arm 102 moves toward the switch assembly and a minimum spring loading is applied to the switch bracket 84 which corresponds to the low fabric load in the washing machine. Thus, the switch assembly will respond to a relatively low level of liquid in the tub to initiate the washing operation. In this manner a saving in both hot water and detergent is realized for the washing operation, plus a water saving for the rinsing operation. As the lever 103 is moved toward the top of the sheet the crank arm 102 moves in a direction to increase the spring loading on the switch bracket 84 so that a proportionately higher liquid level is required within the tub to develop enough pressure in the column 63 to actuate the switch assembly for the washing operation. When the lever is moved to the right the full amount corresponding to the normal wash load the loading on the switch bracket 84 is such that it will require the maximum liquid level in the tub to actuate the switches for the washing operation. It is obvious that with an arrangement of this type the level of liquid within the tub may be infinitely varied from low to the normal full load value.

In operation the operator determines if the amount of clothes or fabrics to be washed is equivalent to a full load or somewhat less then actuates the upwardly projecting end 109 of the lever 103 mounted within the handle 79 to the position corresponding to the load or weight of the material to be washed. This would be at any position between low and normal loads. The lid 22 is elevated and the material to be washed is then placed in the rotatable receptacle 15 through the opening in the top cover 19, including with it the proper quantity of detergent, and the lid is closed. Thereupon the operator decides whether to use hot or warm water for the washing operation and adjusts a water temperature control knob 111 (Figure 8) to position a moveable bridging contact 112 in an electrical circuit 113 to either engage a hot water contact 114 in a circuit 115 to energize the hot water valve solenoid 116 or to bridge contact 114 with a warm water contact 117 to simultaneously energize the warm water valve solenoid 118 through a parallel circuit 119, when the appropriate cams 120 on a drum controller 121 are advanced to complete the circuit from the lines L₁—L₂. For example, if the operator decides to use hot water, the adjustable contact 112 is moved into engagement with the hot water contact 114 and the circuit 115 is conditioned for operation.

Next, the operator grasps a timer control knob 122 and turns the same to the desired washing period to properly position the drum controller 121 and closes the main line switch 123 which conditions the timer motor 91 for operation. Upon turning of the timer control knob, the hot water side of the thermostatically controlled valve is actuated and conducts water at the proper temperature to the receptacle 15 through the inlet nozzle 57. As the level of the water passes above the lower peripheral edge of the agitator 16 air is trapped within the confines of the agitator and this air pressure opposes the entrance of water thereunder through the circumferential opening 60. As the liquid level increases the pressure developed by the increasing head of liquid acts against the air in the column and compresses the same. This increased pressure reacts upon the underside of the diaphragm 64 and tends to move it vertically upward.

When the level of liquid attains a predetermined value the increased pressure within the air column moves the cap 71 upwardly against the force of gravity and with continued upward movement the cap contacts the downwardly projecting button 81. After the cap contacts the button on the lever 82, further movement is opposed by the spring loading on the switch bracket 84 set by the operator until the liquid reaches a level within the tub which produces a static head having a force sufficient to overcome the selected spring loading, at which point the bracket 84 is tilted upwardly and the contacts in the mercury switch 87 are bridged. This action energizes the time motor 91 and the main drive motor 45 through its control circuit and appropriate cams to start the washing operation by oscillating the agitator 16 through the oscillating mechanism 42 and to advance the cams on the timer. Shortly thereafter the switches are tilted still further by an increase in liquid level and the contacts in the switch 86 are opened to deenergize the water supply circuit and terminate the flow of water to the receptacle, at which time the proper quantity of water for the washing operation has been introduced into the tub.

After a predetermined period of agitation in the washing cycle, the timer, through its advancing cams, completes a circuit 124 which energizes the brake solenoid 53 to release the brake 51 holding the receptacle 15 from rotary movement and at the same time causes the clutch 52 to be engaged to directly connect the continuously rotated inner drive shaft 24 to the hollow rotatable outer shaft 25 to rotate the tub carried thereby. Upon rotation of the tub a major portion of the water is extracted from the clothing and discharged from the tub over its top edge.

At the end of the extraction period a cam deenergizes the timer and drive motors and the brake solenoid 57 so that it is actuated to apply the brake and release the clutch to stop and hold the tub stationary. Simultaneously with this action the warm water valve is energized by its cam through a circuit 125 and warm water is admitted to the tub. Upon attaining the proper level therein, as determined by the operator in initially adjusting the level for the washing operation, the switches are tilted in a manner similar to that previously described to again energize the timer and drive motors and interrupt the supply of liquid to the receptacle and initiate the agitate rinse period. The operation of the washing machine during agitating rinse period is identical to the operation thereof during the initial washing period, except that it is of shorter duration, after which the cams 120 are advanced to interrupt the agitating rinse period and the tub is again rotated as above described to remove the rinse water from the clothing being washed and to discharge the same through the drain opening 13.

At the end of the final extraction period the timer motor 91 is deenergized simultaneously with the drive motor 45, the brake solenoid 53 is deenerized to reapply the brake 51 to the tub to stop the same. The washing cycle is now completed and the operator need only raise the lid 22 and remove the fabrics from the tub. Should the next batch of clothing or fabrics require more or less washing water, the operator merely adjusts the arm 109 at the handle 79 to the proper position and the washing cycle will be repeated in a like manner when the selected level has been attained.

Referring now to Figure 5 there is shown modified loading arrangement for the switch operating lever 82 which provides a simplified two liquid level arrangement. Since like parts are given like reference characters a further detailed description of the various elements is not deemed necessary.

Although forming no part of this invention, there is provided a safety lid shut-off and unbalance switch 92 mounted on a tiltable bracket 93 for pivotal movement about the pivot pin 83. An actuating lever 95 therefore has a portion extending downwardly through a rectangular opening or slot 96 in the base section 75 of the lid in spaced relation to the center post 61. The unbalance switch 92 is included in the main line circuit L₁ (not shown) and when moved to its tripped position by engagement with the side wall 73 of the cap, due to an unbalance distribution of fabrics which causes the tub to wobble or gyrate laterally an excessive amount from its normal vertical position or if the lid should be raised by the operator, it renders the entire electric circuit inoperative to stop the washing machine regardless of the demands of the other control apparatus. The details of construction of the entire switch assembly and the unbalance switch and the operation thereof are more fully described in Thomas R. Smith and Dudley P. Combs Patent Number 2,612,766, issued October 7, 1952, and assigned to assignee of the present invention.

In this embodiment, a generally L-shaped leaf spring 130 having oppositely disposed intermediate tabs or lobes 131 disposed adjacent the corner provided by the bend in the spring is mounted so as to react against the switch lever 82. As shown, the L-shaped spring 130 is inverted and the intermediate tabs 131 are adapted to embrace the horizontal pivot pin 83 for the lever. A portion 132 of the spring overlaps the generally horizontal lever 82 carrying the button 81 and the other portion 133 projects downwardly through the slot or opening 96 for the generally vertical unbalance switch lever 95. This latter portion of the spring has an offset bend to provide a corner defining a latch 134 which is adapted to engage the adjacent edge formed by the slot or opening 96 in the bottom wall 76 to define a catch 135.

In the position shown in Figure 5 the spring is loose on the pin 83 with the result no spring load is applied on the lever 82. This corresponds to the position for small or light loads in which only a relatively low liquid level for the washing operation is required. After the timer is adjusted the switches 86 and 87 are actuated as previously described to start the washing and rinsing operations. However, if it is desired to wash a normal quantity of fabrics, the operator merely raises the lid 22 and presses or tilts the unbalanced switch lever 95 in a downward direction or to the left as shown in the drawings. This action causes the lever to engage the leg 133 and rotate the spring clockwise. As the corner 134 of the spring is forced over the edge 135 of the opening 96 the spring is latched and such action provides a downward spring force by the spring arm 132 on the bracket 82 carrying the button 81. This increased spring loading will oppose the diaphragm movement until such time as the level of the liquid in the tub increases the air pressure within the chamber 63 to overcome the loading, after which the switches will be actuated to initiate the washing operation.

If the operator desires to use a partial fill with the control arrangement set for normal washing, the lid 22 is elevated and the free or outwardly projecting end 133 of the spring is pushed toward the unbalanced switch lever 95. This action moves the latch 134 from the catch 135 and the spring loading is removed from the lever 82, after which the lid is closed and the washing operation is carried out as previously described.

It is to be understood, however, that the spring 130 may be modified to provide for several different loadings on the lever 82 and while the spring is shown as being completely free for the low liquid level it could readily be designed to provide a loading if found necessary.

While adjustable spring loading means have been disclosed throughout, it is apparent that other means of loading may be provided in the form of weights or the like.

An important consideration in both embodiments is that when a fluid pressure responsive diaphragm is utilized as disclosed, the air trapped within the confines of the agitator is sufficient to prevent the level from rising appreciably therein, even during the washing operation when the agitator is being oscillated. In this manner it can be seen the water is kept away from the agitator shaft 38 and that grease and the like is not removed from the shaft by the detergent and mixed with the wash water. Also, the splined upper end 39 of the shaft is not operated in the water or washing solution nor can sedimentary material collect between the mating splines and render the agitator difficult to remove. This eliminates a troublesome problem. Another important consideration is that with an increased air pressure within the column should the seal tend to leak any leakage will be air and be in such direction as to oppose upward movement of the grease from the gear housing.

In a construction of this type wherein a single rotatable tub is mounted for lateral movement with respect to surrounding apparatus, a simplified control means has been provided whereby the liquid level sensitive mechanism carried directly by the laterally movable tub is so proportioned that it is capable of engaging associated control apparatus carried by the stationary portion of the washing machine in any offset position the tub may assume within the design limits of the machine.

From the foregoing it can be seen that a simplified mechanism for varying liquid levels for an automatic washing machine has been provided which is readily accessible to the operator for manipulation to accommodate varying amounts or weights of fabrics by using proportionately smaller or larger quantities of water to thereby provide for a more economical operation thereof when less than the normal amount of clothes is to be washed.

In addition, a simplified means for varying the liquid level is provided which is readily accessible for operation, inspection or repair, if needed, and at the same time the means for operating the switches also prevents contact of the wash water with the oscillating shaft and spline and at the same time prevents contamination of the lubricant in the gear housing by water should a leak occur.

This application is related to applications Serial No. 373,956, filed August 13, 1953, and Serial No. 373,957, filed August 13, 1953, both of which are assigned to the same assignee.

While we have herein described and upon the drawings shown illustrative embodiments of invention, it is to be understood that the invention is not limited thereto but may comprehend other constructions, arrangements of parts, details and features without departing from the spirit of the invention.

It is claimed:

1. In a washing machine having a liquid receiving container, an agitator having a hollow center post for holding air under compression as said container is filled with liquid, a control member, a pressure responsive diaphragm on said center post controlling movement of said control member in response to air pressure within said center post, a spring biasing said control member toward said diaphragm, a crank connected to said spring for regulating the bias exerted on said control member, and detent means resisting movement of said crank.

2. In a washing machine having a liquid receiving container, an agitator having a hollow center post for holding air under compression as said container is filled with liquid, a control member, a pressure responsive diaphragm on said center post, means biasing said control member towards said diaphragm, said last-named means including crank means regulating the amount of bias on said control member to vary the amount of air pressure necessary to move the control member.

3. In a washing machine having a liquid receiving container, an agitator having a hollow center post for holding air under compression as said container is filled with liquid, a control member, a pressure responsive diaphragm on said center post controlling movement of said control member, and presettable means biasing said control member toward said diaphragm to vary the amount of the air pressure necessary to move said control member.

4. In a washing machine having a liquid receiving container, an agitator having a hollow center post for holding air under compression as said container is filled with liquid, a control member adjacent said center post, a pressure responsive diaphragm mounted on said center post to sense varying water levels within said container through changes of air pressure within said center post, bias means biasing said control member toward said diaphragm, and latch means controlling said bias means to vary the degree of bias exerted on said control member.

5. In a washing machine having a liquid receiving container and an agitator including a center post mounted therein, a control member mounted adjacent said center post, movable means mounted in said center post for sensing varying liquid levels within said container, bias means biasing said control member toward said movable means, manually presettable means controlling said bias for regulating the bias exerted on said control member, and detent means for maintaining said manually presettable means in each of its preset positions.

6. In a washing machine having a liquid receiving container and an agitator including a center post mounted therein, a control member mounted adjacent said center post, movable means mounted on said center post for sensing varying liquid levels within said container, a spring biasing said control member toward said movable means, a manually presettable crank connected to said spring for regulating the bias exerted on said control member, and detent means for maintaining said crank in each of its preset positions.

References Cited in the file of this patent

UNITED STATES PATENTS

| | | |
|---|---|---|
| 2,305,154 | Gilbert | Dec. 15, 1942 |
| 2,471,778 | Ringer | May 31, 1949 |
| 2,583,077 | Arney | Jan. 22, 1952 |
| 2,619,822 | Wible | Dec. 2, 1952 |
| 2,635,445 | Smith | Apr. 21, 1953 |
| 2,656,431 | Bochnan | Oct. 20, 1953 |